United States Patent [19]

Nelson

[11] 4,303,224

[45] Dec. 1, 1981

[54] CAMBER AND CASTER ADJUSTING TOOL

[76] Inventor: Leonard G. Nelson, 5644 - 40th Ave. S., Minneapolis, Minn. 55417

[21] Appl. No.: 116,454

[22] Filed: Jan. 29, 1980

[51] Int. Cl.³ .......................... B66F 1/00; B66F 15/00
[52] U.S. Cl. .................................................. 254/131
[58] Field of Search ............................ 254/1, 129–131, 254/11, 15–17, 243–250; 29/267, 270; 81/3 R; 72/704

[56] References Cited

U.S. PATENT DOCUMENTS

| | | | |
|---|---|---|---|
| 2,183,806 | 12/1939 | Cont | 254/250 |
| 2,725,946 | 12/1955 | Welter | 254/129 |
| 3,537,685 | 11/1970 | Gregory | 254/131 |
| 3,807,693 | 4/1974 | Castol | 254/1 |
| 3,830,467 | 8/1974 | Sprague et al. | 254/1 |
| 3,840,211 | 10/1974 | Castol | 254/131 |
| 3,915,431 | 10/1975 | Castol | 254/131 |

Primary Examiner—Robert C. Watson

[57] ABSTRACT

A lever-type tool for adjusting the camber and caster of automobile wheels. A fulcrum point of a lever of the third class is provided on the tool which bears against an automobile frame to provide a force on the end of the automobile's wheel pivot bar to thereby move the pivot bar and its attached arm relative to the automobile frame, the arm in turn being attached to the upper portion of a wheel. Opposed ends of the pivot bar may be individually adjusted by this tool which changes the camber and caster of the wheel acting through the arm. A force applying lever forms a part of the tool to thereby multiply the applied force and because the position of the handle can be adjusted relative to the remainder of the tool, it is possible to accommodate the various possible spaces between the fenders and tires of different vehicles.

5 Claims, 2 Drawing Figures

CAMBER AND CASTER ADJUSTING TOOL

BACKGROUND OF THE INVENTION

I. Field of the Invention

The present invention relates generally to the apparatus for adjusting the camber and caster on the non-driven wheels of motor vehicles and more specifically to a tool for applying forces to the vehicles pivot bar whereby the desired adjustments may be made. The apparatus exerts force against the extreme end of the pivot bar to yield a maximum change in camber and caster for a minimum of force exerted. A fulcrum point on the lever apparatus bears against a portion of the automobile frame which is adjacent to the pivot bar and no special opening in the frame or projection from the frame is required to provide a purchase for the tool.

II. Description of the Prior Art

There are a number of camber and caster adjusting tools available. In general, these tools engage holes in the automobile frame which are specially provided for this tool. These tools usually consist of a bar, having a projection at one extreme end, a handle at the opposite end, and a pivotable mounted U-shaped projection intermediate. In use, the projection of the bar is inserted into one of two purchase holes in the automobile frame provided for the tool, then the U-shaped projection is placed over the central portion of the pivot bar nearest the purchase hole. The pivot bar adjusting nuts are loosened, force is exerted manually against the tool handle to adjust the wheel camber and caster, after which the adjusting nuts are tightened. The tool is removed from the first pivot hole and placed in the second pivot hole provided in the frame. The U-shaped projection is placed over the opposite end of the pivot bar and the camber and caster adjusted again.

This tool requires a special opening in the frame to obtain a purchase on the frame. The tool bears against the middle, rather than the extreme end of the pivot bar, which requires a greater force upon the tool in order to adjust the camber and caster.

SUMMARY OF THE INVENTION

The present invention comprises a camber and caster adjusting tool which exerts a force upon the extreme end of a pivot bar to minimize the amount of force required for adjustment. The tool has a circular opening which is merely placed over each end extension of the vehicles's pivot bar as a means of attachment to the pivot bar. A fulcrum point on the tool bears against the frame of the automobile adjacent the pivot bar and the need for special hole openings or special lugs on the automobile frame is obviated. A lever handle, which is adjustable with respect to the tool head, permits the tool to be used on a number of different automobiles with no interference with either the fender or the tire.

BRIEF DESCRIPTION OF THE INVENTION

Figure 1:
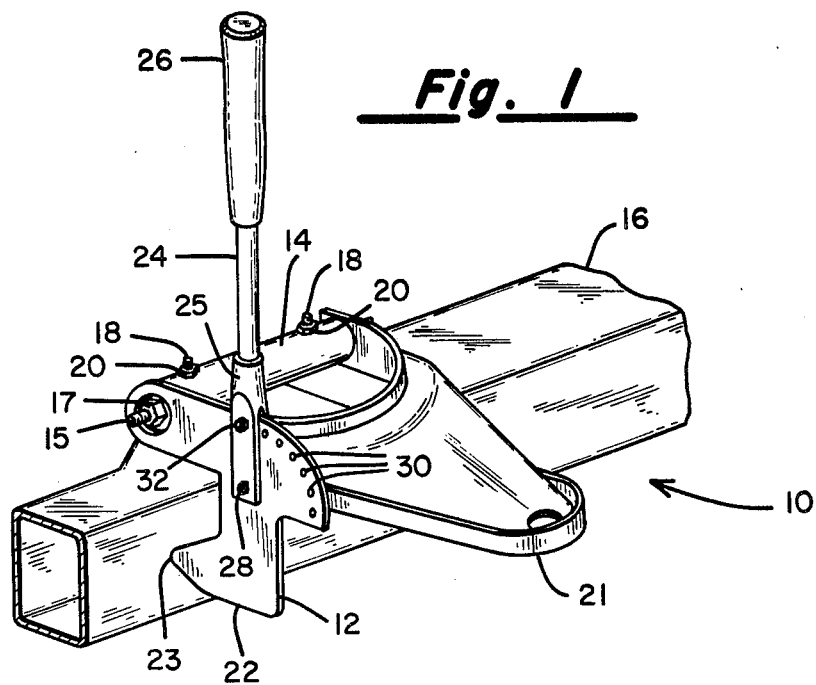
FIG. 1 is a perspective view of the preferred embodiment of the device attached to the front of a pivot bar on the right front wheel of an automobile.

Referring first to the perspective view FIG. 1, the adjusting tool, indicated generally by numeral 12, is shown as being attached to the extreme end of the vehicle's pivot bar 14 and has a fulcrum point bearing against the frame 16 of an automobile. Two bolts 18 attach the pivot bar 14 to frame 16 with the heads of the said bolts being concealed within frame 16. Bolts 18 extend through two slotted holes, not shown, in the top of frame 16. The two slotted holes are perpendicular to pivot bar 14 to permit adjusting the relative angle and position of said pivot bar relative to frame 16. Two nuts 20, containing integral lock washers, when tightened, hold pivot bar 18 in place. An arm 21 contains holes, not shown, in its bifurcated extensions, said holes receiving the threaded extensions 15 on opposite ends of the pivot bar 14. Any chnage in angle or position of pivot bar 14 relative to frame 16 will therefore also change the position and angle of arm 21 in a like manner. Threaded extensions 15 of pivot bar 14 which extend through the said holes in arm 21 are secured by nuts 17.

Adjusting tool 12 consists of a head 22 and a lever arm 24. Lever arm 24 terminates in a handle grip 26. Head 22 has a pivot point 23 which bears against frame 16. Lever arm 24 also has an integral bifurcated extension 25, which has two matching pairs of holes, not shown, near each extreme end of said bifurcated extension. Bolt and nut 28 are connected through the pair of holes nearest the extreme outer end of bifurcated extension 25 to provide a pivot point for lever arm 24 with respect to its head 22. A series of holes 30 through head 22 are arranged in an arc as illustrated. A bolt and nut 32 through one of holes 30 and the second matching pair of holes through bifurcated extension 25 secures lever arm 24 in a fixed position with respect to head 22 at any desired position along said arc.

The lever arm 24 and its head 22 thus cooperates with the frame 16 and the pivot rod 14 as a lever of the third class such that when a pulling force is applied to the handle grip 26, the end of the pivot rod which is attached will be translated horizontally.

Figure 2:
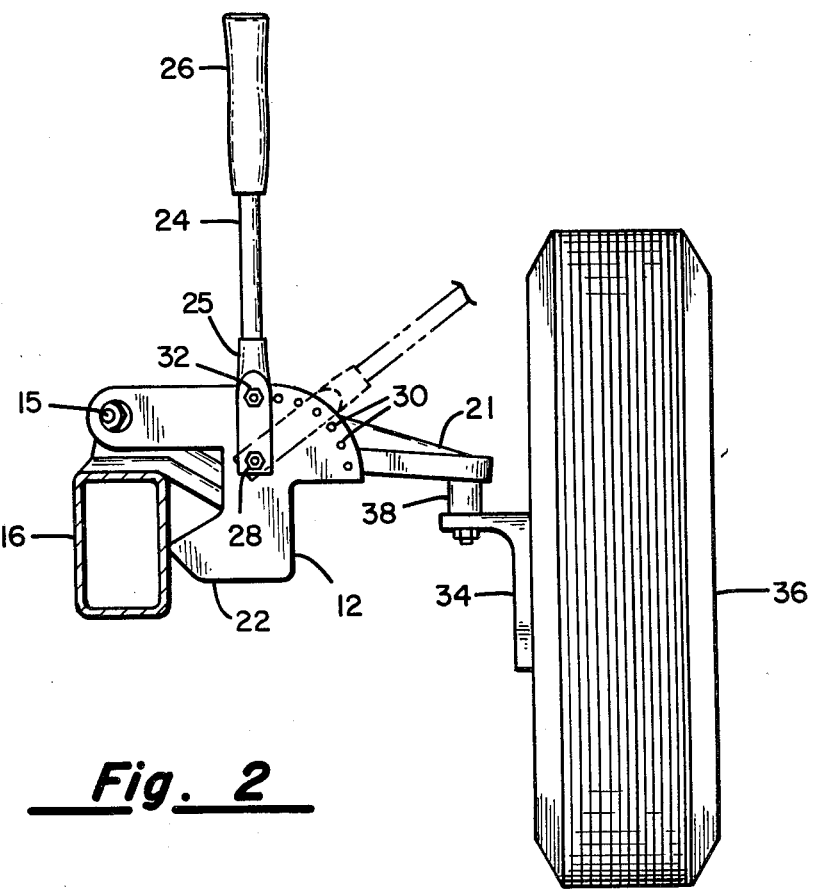
FIG. 2 is an end view of the same device attached to the automobile as seen from the front end of the automobile.

Referring to FIG. 2, the relationship of the tool 12 to a wheel and tire 36 can be seen. A joint 38 pivotably connects arm 21 to wheel and tire 36.

To adjust the camber of wheel 36 the position of pivot bar 14 relative to said wheel is changed. In the instant case a more positive camber would be achieved by moving both ends of pivot bar 14 outward relative to frame 16, whereas a more negative camber would be achieved by moving both ends of pivot bar 14 inward away from said wheel. Caster is adjusted by changing the angle of pivot bar 14 relative to wheel 36. A more positive caster would be achieved by moving the forward end of pivot bar 14 toward wheel 36 and the rearward end of said pivot bar away from said wheel. A negative caster would be achieved by moving the forward end of pivot bar 14 away from wheel 36 and the rearward end of the pivot bar 14 toward said wheel. In actual use the mechanic makes an adjustment on first one end of pivot bar 14 and then the opposite end which changes both camber and caster simultaneously. A gauge is attached to the wheel to measure both the camber and caster to determine the necessary adjustments.

To use adjusting tool 12, the hole in the head of the tool is first placed over one of the pivot bar extensions 15 as illustrated in FIG. 1. Bolt 32 is then removed from the tool and arm 24 is moved arcuately to be centered in the area between the vehicle's fender, not shown, and its wheel 36. Then, nut and bolt 32 are reinserted through one of the holes 30 to hold lever 24 nearest this desired arcuate position. A gauge (not shown) used to read the wheel camber and caster is attached in a conventional fashion to wheel 36. Nuts 18 which hold pivot bar 14 secure to the frame are then loosened with the nut furtherest from the tool loosened less that the nut nearest the tool. When nuts 18 are loosened pivot bar 18 tends to move inward relative to frame member 16. Force is then exerted manually upon handle 26 in a clockwise direction as viewed in the drawing to thereby adjust the caster and camber toward the desired value while reading the gauge. Nut 18 nearest the tool is then tightened slightly and the tool is moved to the opposite end of pivot bar 14 over the other extension 15 and nut 18 nearest this extension is loosened slightly. Force is again exerted upon handle 26 to adjust the camber and caster in the appropriate direction and nut 18 nearest the tool is retightened slightly. If the camber and caster are now correct then both nuts 18 are tightened fully, otherwise the tool 12 again is moved to the opposite end of the pivot bar and the process is repeated. When the camber and caster are correct after nuts 18 are tightened, the adjustment is completed. The adjustment process is essentially a successive adjustment process which relies greatly upon the skill of the mechanic, since both the camber and caster are interrelated adjustments. The process is repeated upon the other non-driven wheel of the automobile to complete the process.

This adjustment tool 12 greatly simplifies the adjustment process because of the ease of attachment, in that the mounting aperture in the tool is merely placed over one of the vehicle's pivot bar extensions 15 for attachment. The lever arm 24 can always be centered in the open space between fender and wheel in such a fashion that the user may manipulate the handle. This permits the tool to be used on a number of different vehicle types. A minimum amount of force is required because the force is exerted upon the extreme end of pivot bar 14 which makes for ease of more accurate adjustments. The fulcrum point merely bearing against frame 16 totally eliminates the need for any holes or other projections on the frame to provide a purchase for the tool.

Although specific construction of the hereindisclosed camber and caster adjusting tool has been shown and described, it is obvious that those skilled in the art may make various modifications and changes to them without departing from the spirit and scope of the present invention. It is to be expressly understood that the instant invention is limited only by the appended claims.

What is claimed is:

1. Apparatus for facilitating the adjustment of camber and caster of a vehicle wheel said vehicle being of the type having a pivot bar adjustable relative to the vehicle frame and means coupling said pivot bar to said wheel, comprising:
   (a) a generally flat head member having first aperature means for securing a portion of said head member to said pivot bar, said head member having a pivot point displaced laterally from said aperature means for abutting a predetermined portion of said frame; and
   (b) a handle member of a predetermined length secured to said head member at a location intermediate said first aperature means and said pivot point.

2. Apparatus as in claim 1 wherein said handle means is angularly positionable with respect to a line extending between said aperture and said pivot point.

3. Apparatus as in claim 1 wherein said head member includes a pattern of further apertures generally circumferentially arranged in spaced apart relationship with respect to a central opening, said pattern being generally disposed intermediate said first aperture means and said pivot point; said handle member including two aligned apertures spaced apart along the length thereof by a distance corresponding to the radial distance between said central opening and said pattern of further apertures, and pin means extending through said aligned apertures in said handle member and into said central opening and a selected one of the apertures in said pattern of apertures.

4. Apparatus for facilitating the adjustment of camber and caster of vehicle wheel said vehicle being of the type having a pivot bar adjustable relative to the vehicle frame and means coupling said pivot bar to said wheel, comprising:
   (a) a generally flat head member having first aperture means for securing a portion of said head member to said pivot bar, said head member having a pivot point displaced laterally from said aperture means for abutting a portion of said frame, a pattern of further apertures generally circumferentially arranged in spacedapart relationship with respect to a central opening, said pattern being generally disposed intermediate said first aperture means and said pivot point;
   (b) a handle member of a predetermined length secured to said head member at a location intermediate said first aperture means and said pivot point;
   (c) said handle member including two aligned apertures spaced apart along the length thereof by a distance corresponding to the radial distance between said central opening and said pattern of further apertures; and
   (d) pin means extending through said aligned apertures in said handle member and into said central opening and a selected one of the apertures in said pattern of apertures.

5. Apparatus as in claim 4 wherein said handle member includes a bifurcated extension, said two aligned apertures extending through both legs of said bifurcated extension.

* * * * *